United States Patent [19]

Tamori

[11] Patent Number: 5,526,701
[45] Date of Patent: Jun. 18, 1996

[54] MAGNETIC SURFACE PRESSURE INPUT PANEL

[75] Inventor: Teruhiko Tamori, Saitama-ken, Japan

[73] Assignee: Enix Corporation, Japan

[21] Appl. No.: 327,688

[22] Filed: Oct. 24, 1994

[30] Foreign Application Priority Data

Oct. 25, 1993 [JP] Japan .................................. 5-288720

[51] Int. Cl.[6] ...................................................... G01L 1/00
[52] U.S. Cl. ................... 73/862.046; 73/862.041
[58] Field of Search ........................ 73/862.041, 862.046, 73/865.7; 382/4, 5; 324/207.2, 207.21; 340/407.1, 407.2

[56] References Cited

U.S. PATENT DOCUMENTS

| | | | |
|---|---|---|---|
| 4,085,305 | 4/1978 | Zenk et al. ........................ | 200/5 A |
| 4,429,413 | 1/1984 | Edwards ............................ | 382/4 |
| 5,055,820 | 10/1991 | Kimura et al. .................... | 338/32 H |
| 5,079,949 | 1/1992 | Tamori .............................. | 73/865.7 |
| 5,325,869 | 7/1994 | Stokes ............................... | 73/862.046 |

FOREIGN PATENT DOCUMENTS

| | | |
|---|---|---|
| 4203124A1 | 8/1992 | Germany . |
| WO/84/04820 | 12/1984 | WIPO . |

OTHER PUBLICATIONS

Patent Abstracts of Japan, vol. 13, No. 348 (E–799) Aug. 4, 1989 & JP–A–01 107 586 (Yaskawa Electric Mfg) Apr. 25, 1989, Abstract.
Patent Abstracts of Japan, vol. 13, No. 329 (P–904) Jul. 25, 1989 & JP–A–01 094 418 (Enitsukusu KK) Apr. 13, 1989.

*Primary Examiner*—Richard Chilcot
*Assistant Examiner*—Ronald Biegel
*Attorney, Agent, or Firm*—Townsend and Townsend and Crew

[57] ABSTRACT

An active matrix surface pressure input panel comprises a flexible magnetic sheet stacked onto a circuit plate. The circuit plate includes an insulating base plate with first and second groups of intersecting electrode lines and a multiplicity of detection elements formed thereon. Each detection element includes a magnetic sensitive element coupled to the electrode lines and configured to generate an electrical signal corresponding to the distance between the magnetic sensitive elements and respective overlying portions of the magnetic sheet. The electrode lines are coupled to an electrical circuit that determines the relative location of each electrical signal to map an overall surface pressure distribution. With this configuration, the surface pressure input panel exhibits high definition over a relatively large detection area so that complicated surfaces, such as fingerprints, can be accurately detected and reproduced.

25 Claims, 7 Drawing Sheets

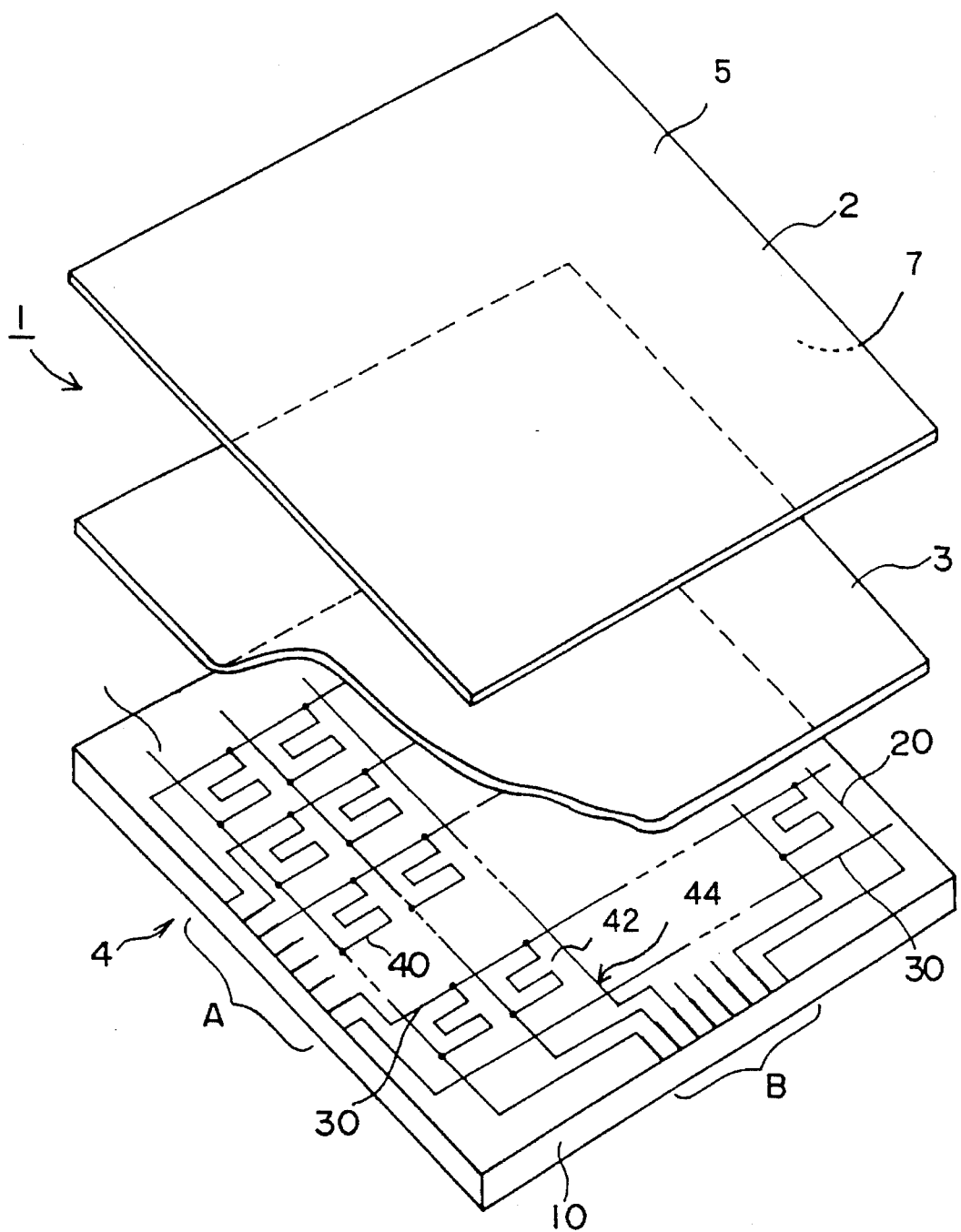
F I G. 1

DETECTING AN AMOUNT CORRESPONDING TO 1 PICTURE

10

MAGNETIC SURFACE PRESSURE INPUT PANEL

FIELD OF THE INVENTION

This invention relates to surface pressure input panels generally and more specifically to a magnetic surface pressure input panel suitable for detecting complicated surface contours and irregularities such as a fingerprint pattern.

BACKGROUND OF THE INVENTION

The inside surface of the fingertip has intricate contours that are unique to each individual. This has made the fingerprint pattern an important vehicle for identification, particularly for law enforcement purposes. To facilitate identification via fingerprints, efforts have been made to develop fingerprint detection devices capable of electronically mapping an individual fingerprint pattern. Accurately mapping the contour of each person's fingertip, however, has proven to be a difficult and expensive task. This is because each fingerprint pattern is made up of a large number of convex portions, or ridges, separated by concave portions or grooves that generally extend in random directions around the fingertip. These ridges and grooves have minute dimensions, on the order of 100 µm, making them difficult to detect.

Conventional fingerprint detection devices generally employ a surface pressure input panel that includes a contact sheet which changes in some manner when it is engaged by the various ridges and grooves of the fingertip. One such device comprises a conductive rubber sheet that undergoes local variations in conductivity when engaged by a surface with a pressure differential. Similar devices include a resistive film that varies in resistance with changes in surface pressure. These devices employ a means for detecting the changes in the contact sheet or film in order to electronically map the contour of the fingertip. The detection means, however, typically has difficulty detecting small pressure changes, particularly when a non-uniform pressing force is applied or the fingertip is contaminated with grease, sweat or the like. Therefore, these devices are often incapable of accurately detecting the small surface variations necessary for mapping the contour of a fingertip.

Other fingerprint detection devices have attempted to overcome this problem by employing MOS field-effect transistors or piezoelectric thin films to detect small surface variations (e.g., see Japanese Patent Application No. Hei 5-61966). These devices, however, generally require complicated manufacturing techniques and relatively expensive materials, such as silicon semiconductor substrates. Although these devices can produce high definition, they are difficult to manufacture and, therefore, are very expensive. Accordingly, manufacturing these devices to map a large detection area, such as a fingerprint pattern (which is very large compared to the size of the individual surface changes or irregularities) is not presently feasible.

SUMMARY OF THE INVENTION

The present invention is directed to an inexpensive surface pressure panel capable of detecting complicated surface contours such as a fingerprint pattern. To accomplish this, the invention comprises a surface pressure input panel having a flexible magnetic sheet coupled to a circuit plate. The magnetic sheet is adapted to conform to surface contours (e.g., deflect or sink) and the circuit plate comprises an insulating base plate with appropriate electrode lines formed thereon. The circuit plate further includes a multiplicity of detection elements, each including a magnetic sensitive element, distributed over the area of the board, facing the magnetic sheet and coupled to the electrode lines. Each detection element is configured to generate an electric signal corresponding to the distance between the magnetic sensitive elements and respective overlying portions of the magnetic sheet. The electrode lines are preferably arranged in an X–Y grid so that the generated signal can be detected and the location of each detection element can be determined.

In a preferred configuration, the surface pressure input panel is an active matrix type array having first and second (e.g. X and Y) groups of electrode lines intersecting each other at intersection points to form a matrix pattern on the circuit plate. A detection element at each intersection point includes a magnetic sensitive element configured so that an electrical signal can be generated that is preferably proportional to the strength of a magnetic field received by the element. The magnetic sheet generates a magnetic field that increases in magnitude (with respect to the magnetic elements) as the sheet deflects or sinks toward the circuit plate so that the generated electrical signals are proportional to the distance between the magnetic sensitive elements and the respective overlying portions of the magnetic sheet. In this manner, the input panel can generate a plurality of different electric signals that are representative of the varying degrees of pressure applied by the object to the magnetic sheet, e.g. due to surface variations (ridges and grooves) of a fingerprint.

When installed, the pressure input panel of the invention is coupled to an X register and a Y direction switch which cycle through the groups of electrode lines so that a detector can correlate the generated electrical signals to the location of the detection units from which they emanate. The electrical signals are then appropriately processed so that the contour of the fingertip can be reproduced. With this configuration, the invention provides a relatively inexpensive surface pressure input panel that exhibits high definition over a relatively large detection area so that extremely complicated surfaces, such as fingerprints, can be accurately detected and reproduced.

In one embodiment, the magnetic sensitive elements each have a resistance to electric current generally proportional to the magnitude of the magnetic field to which the element is subjected. Thus, as the magnetic sheet is deflected towards the magnetic element, its resistance increases. The magnetic elements are coupled to electrode lines associated with each intersection point such that, when an electric potential is applied to the associated electrode lines, a current flows through the elements. This current will be generally proportional to the resistance of the magnetic element and, therefore, will reflect to the distance between the element and the respective overlying portion of the magnetic sheet (i.e., the pressure applied to the sheet by the object).

In another embodiment, the magnetic sensitive elements are coupled to the first and second groups of electrode lines by switches, preferably thin film transistors (TFT's) of the type widely used for driving liquid crystal displays. One end of the magnetic element is coupled to the transistor and the other end is coupled to a detection line. When an electric potential is applied to the electrode lines, a current, which is proportional to the resistance of the magnetic element, flows through the magnetic element and along the detection line, where it can be sensed by the detector.

In a further embodiment, the magnetic sensitive elements comprise conductive elements that preferably exhibit the Hall effect. When the magnetic sheet applies a magnetic field and a current is directed through the conductive elements, a voltage potential is generated across the conductive elements. This voltage is generally proportional to the magnitude of the magnetic field. The conductive elements are coupled to the electrode lines so that the generated voltage can be detected and the relative location of the conductive elements can be determined.

BRIEF DESCRIPTION OF THE DRAWINGS

FIG. 1 is an exploded perspective view of a surface pressure input panel according to the principles of the present invention;

DESCRIPTION OF THE PREFERRED EMBODIMENTS

Figure 2:
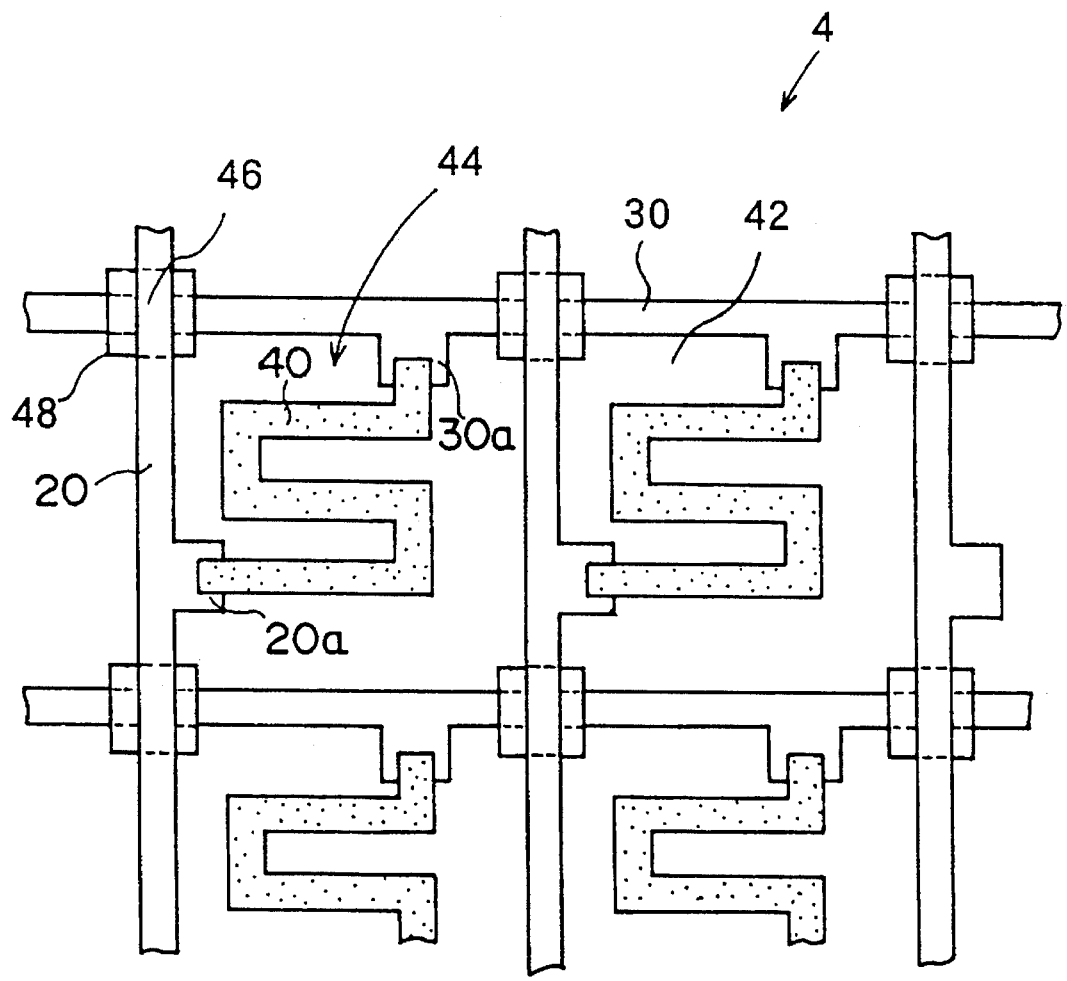
FIG. 2 is an enlarged view of detection elements formed on a circuit board of the surface pressure input panel of FIG. 1.

Referring to the drawings, wherein like numerals indicate like elements, a surface pressure input panel 1 constructed according to the present invention generally includes a magnetic sheet 2 and an insulation film 3 stacked onto a circuit plate 4 for detecting the surface pressure differentials across the magnetic sheet.

Referring to FIG. 1, magnetic sheet 2 and insulation film 3 are preferably laminated to circuit plate 4 such that they are spaced apart from the circuit plate by a relatively small distance, preferably about 10–200 μm. Magnetic sheet 2 is constructed so that it will substantially conform to the contours and surface irregularities of an object that is pressed against it, such as the fingerprint pattern on the inside surface of a fingertip. In one configuration, magnetic sheet 2 will deflect in response to the surface contours (see FIG. 5). The magnetic sheet has a first surface 5 that is magnetized with an S pole and second surface 7 magnetized with an N pole so that a magnetic field, having a magnitude large enough for detection by circuit elements on circuit plate 4, is generated around the sheet. Insulating film 3 serves to insulate circuit plate 4 from the magnetic sheet and preferably comprises a conventional insulating material such as polyethylene terephthalate (PET).

Circuit plate 4 comprises an insulating base plate 10, which may be made of a glass or ceramic material, for example. An amorphous silicon coating 12 on the upper surface of base plate 10, preferably applied by a conventional photolithographic technique, forms a plurality of parallel X direction electrode lines 20 and Y direction electrode lines 30 arranged perpendicular to the X electrode lines. X and Y electrode lines 20, 30 are gathered on edges A, B, respectively, of base plate 10 and connected to external circuits via connectors (not shown). X electrode lines 20 and Y electrode lines 30 function as scanning electrode lines as is described in greater detail below.

The X and Y electrode lines define between them generally rectangular areas 42 for detection elements 44. Each detection element 44 includes a magnetic sensitive element 40 electrically coupled to X and Y electrode lines 20, 30. In a preferred configuration, the magnetic elements are magnetic resistance elements formed on circuit plate 4 by, for example, a high-frequency sputtering process. The magnetic resistance elements have an electric resistance that varies when the elements are subjected to a magnetic field. As the strength of the magnetic field increases, the elements' resistance to current generally increases. The rate of variance can be adjusted by an appropriate selection of material of the magnetic resistance element, which may, for example, comprise a multi-layer film of an Ni—Fe series alloy. Selection of different magnetic materials allows the user to adjust the detection sensitivity of the surface pressure input panel.

FIG. 2 illustrates in greater detail a group of detection elements 44 formed on circuit plate 4 of surface pressure input panel 1. Each X electrode line 20 intersects one of the Y electrode lines 30 at an intersection point 46. An insulating spacer 48 is formed at each intersection point 46 between X and Y electrode lines 20, 30 to insulate the electrode lines from each other. Preferably, insulating spacer 48 is an $SiO_2$ film formed by a conventional technique such as masking and vapor deposition. Each electrode line is also coated with an insulating film (not shown) such as $SiO_2$ or polyimide to prevent the electrode lines from contacting magnetic sheet 2.

In a preferred configuration, the interval between adjacent X electrode lines 20 and adjacent Y electrode lines 30 is about 20 to 150 μm and each detection element has an area of approximately 200–14,000 $μm^2$. This ensures that relatively small elevation changes in the lower surface of magnetic sheet 2, on the order of from several to tens of microns, can be detected by magnetic sensitive elements 40.

Each magnetic sensitive element 40 has one end coupled to a connection tab 20a of one of the X electrode lines 20 and the other end coupled to a connection tab 30a of one of the Y electrode lines 30. When a signal is applied to the X electrode line associated with a given intersection point 46, a current, which is proportional to the resistance of the corresponding magnetic sensitive element 40, will flow through the magnetic element and along the associated Y electrode line as is discussed below.

It should be noted that the invention is not limited to the configuration described above and shown in FIGS. 1–3. For example, electrode lines 20, 30 could be oriented at angles other than 90° with respect to each other and can have larger or smaller intervals between adjacent lines, if desired. In addition, magnetic elements 40 can have a variety of shapes and sizes which differ from the preferred configuration shown in FIGS. 1 and 2, so long as they are each disposed within an individual detection element and suitably attached to the X and Y electrode lines.

Figure 3:
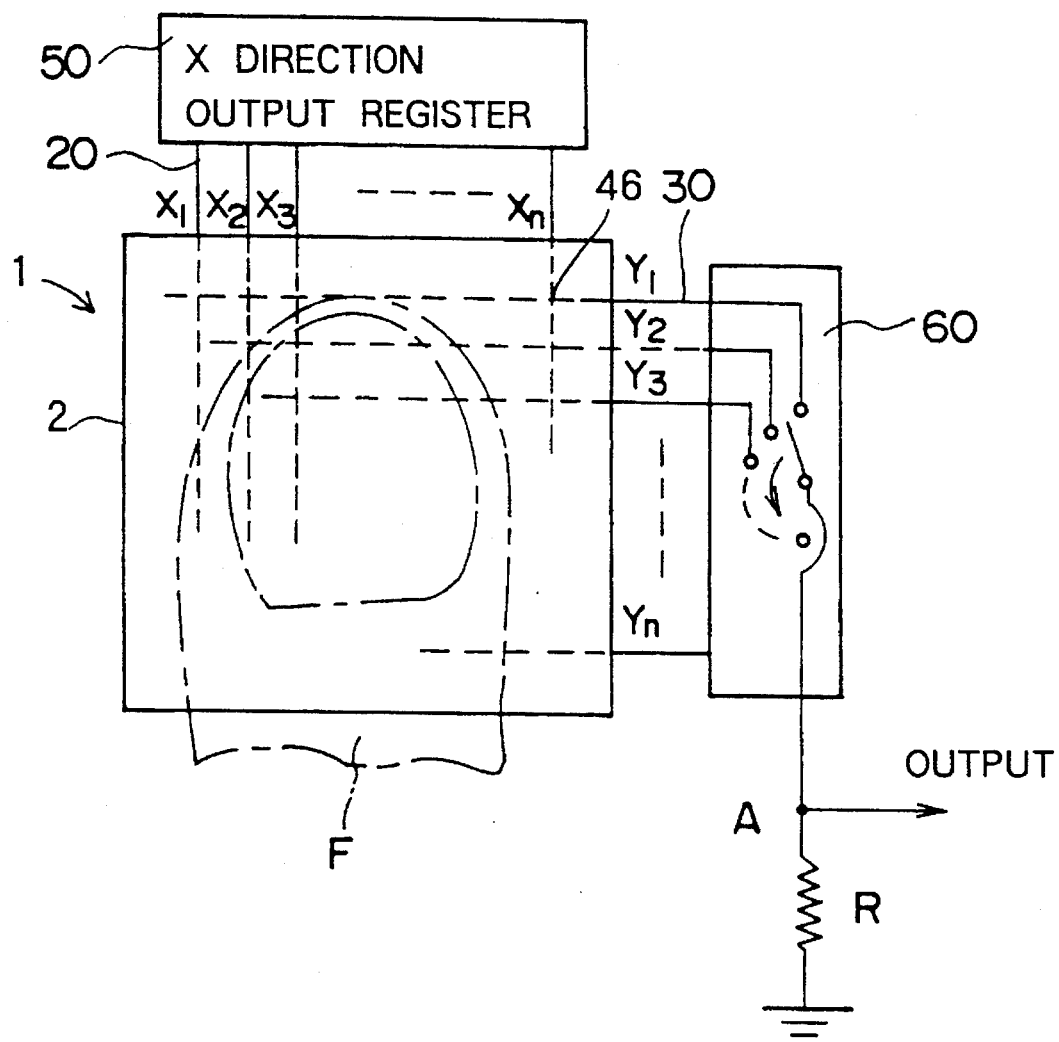
FIG. 3 is a block diagram of a fingerprint detection circuit employing the input panel of FIG. 1.

The pressure surface input panel of the present invention is particularly suitable for detecting a fingerprint pattern on the inside surface of a fingertip F. To accomplish this, input panel 1 is connected to an electric circuit 49, as shown in FIG. 3. The entire electric circuit can be formed on insulating base plate 10 or circuit plate 4 can be connected to a separately formed circuit with connectors (not shown). X electrode lines 20 are connected to an X direction output register 50 and Y electrode lines 30 are connected to a Y direction switching/detection circuit 60. The Y switching/detection circuit is grounded via a resistor R so that a potential can be sensed at point A when a detecting current flows through resistor R.

When fingertip F is pressed onto surface pressure input panel 1, magnetic sheet 2 and insulating film 3 generally conform to the inside surface of the fingertip and, therefore, deflect downward towards circuit plate 4. Because the ridge and groove portions of fingertip F have different surface elevations, different pressing forces will act on the magnetic sheet. Thus, depending on the amount of pressure and the resulting deflection of an overlying portion of magnetic sheet 2, the distance between this portion and the corresponding magnetic element 40 will vary.

Figure 5:
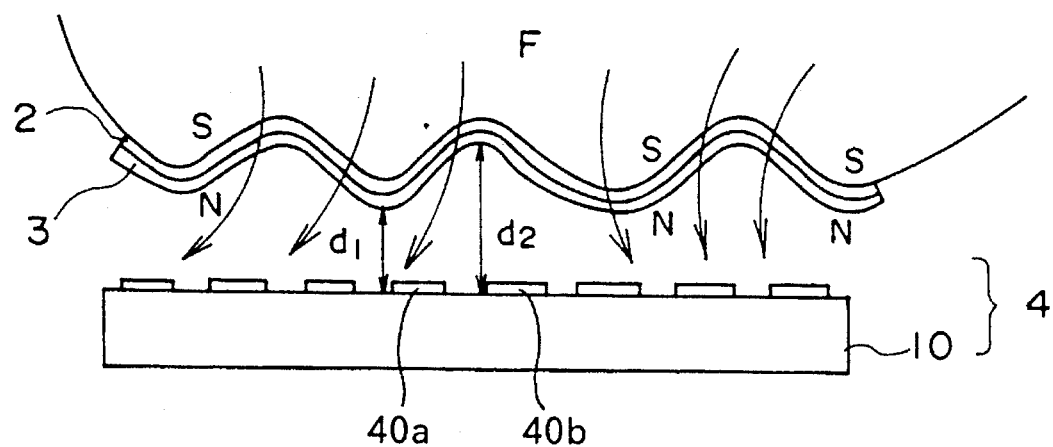
FIG. 5 is an illustrative side view of the input panel of FIG. 1 detecting the surface variations of a fingertip.

As shown in FIG. 5, for example, a magnetic element 40a located immediately under or near a ridge or convex portion of the fingertip F will be a relatively small distance $d_1$ away from the overlying portion of magnetic sheet 2. On the other hand, a magnetic element 40b located immediately under or near a groove or concave portion of fingertip F will be a relatively larger distance $d_2$ away from the overlying portion of magnetic sheet. Consequently, the magnetic element 40a located underneath the ridge portion of fingertip F will be subjected to a stronger magnetic field from magnetic sheet 2 and will exhibit a larger resistance than the magnetic element 40b located underneath the groove portion of fingertip F.

Figure 4A:
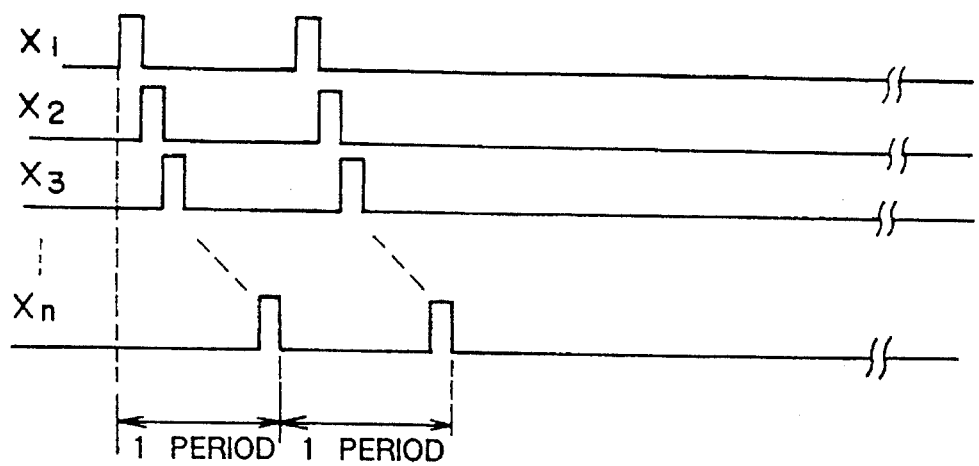
FIGS. 4A and 4B illustrate pulse signals that are applied to X and sensed by Y direction electrode lines on the circuit board of FIG. 1.
Figure 4B:
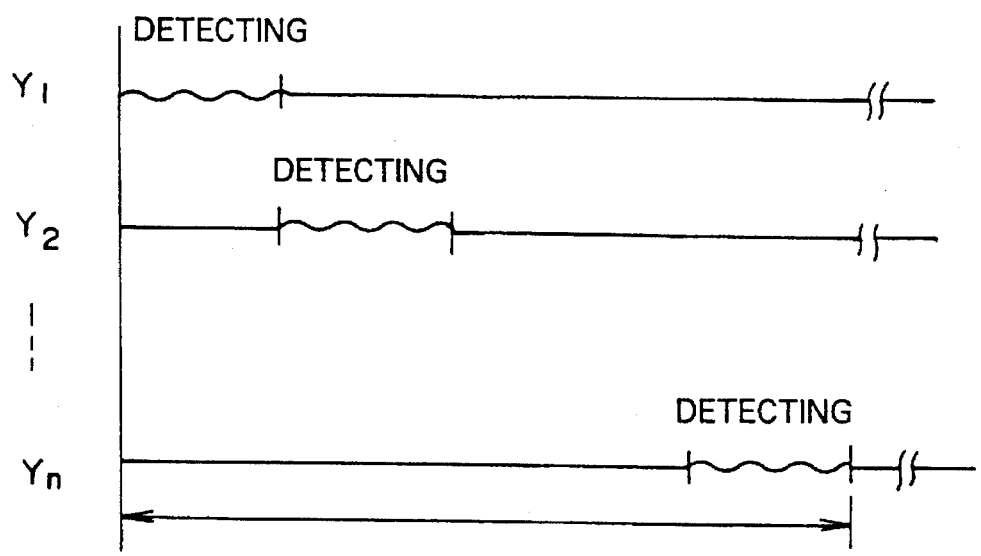

To detect the changes in resistance of magnetic sensitive elements 40, X register 50 sequentially applies pulse signals to X electrode lines 20 at a predetermined timing or frequency, as shown in FIG. 4A. Simultaneously, Y switching circuit 60 synchronously cycles through Y electrode lines 30 at the same predetermined timing or frequency, as shown in FIG. 4B. In one embodiment, X register 50 sequentially applies a pulse signal to each X electrode line while Y switching circuit 60 locks onto a given Y line to sequentially converge the X and Y signals at intersections points 46 along the given Y line. This process is repeated for each Y line 30 so that the detection circuit can determine the relative location of the electrical signals generated by magnetic sensitive elements 40. Of course, this procedure can be reversed (i.e., Y circuit 60 cycles through Y electrode lines 30 while X register applies a signal to a given X electrode line).

Referring to FIG. 3, when the X register and the Y switching circuit converge at an intersection point 46, the signal from X register 50 flows through the corresponding magnetic element 40 and generates a potential across resistor R that can be detected by a detector (not shown) at detection point A. If, for example, an overlying portion of magnetic sheet 2 is deflected towards the corresponding magnetic element 40, the distance between these two elements decrease, thereby increasing the strength of the magnetic field to which the magnetic element is subjected. Thus, the resistance of the magnetic element increases, thereby decreasing the current and the potential at detection point A. This change in potential is generally proportional in an analog manner to the distance in which the overlying portion of magnetic sheet 2 has been deflected (i.e., the height of the surface variation along the corresponding surface portion of fingertip F). A detector (not shown) uses conventional signal processing to determine the potential at every intersection point 46, and its relative location, so that a surface pressure differential, corresponding to the fingerprint pattern of fingertip F, can be computed and the sensed fingerprint can be reproduced.

Figure 6:
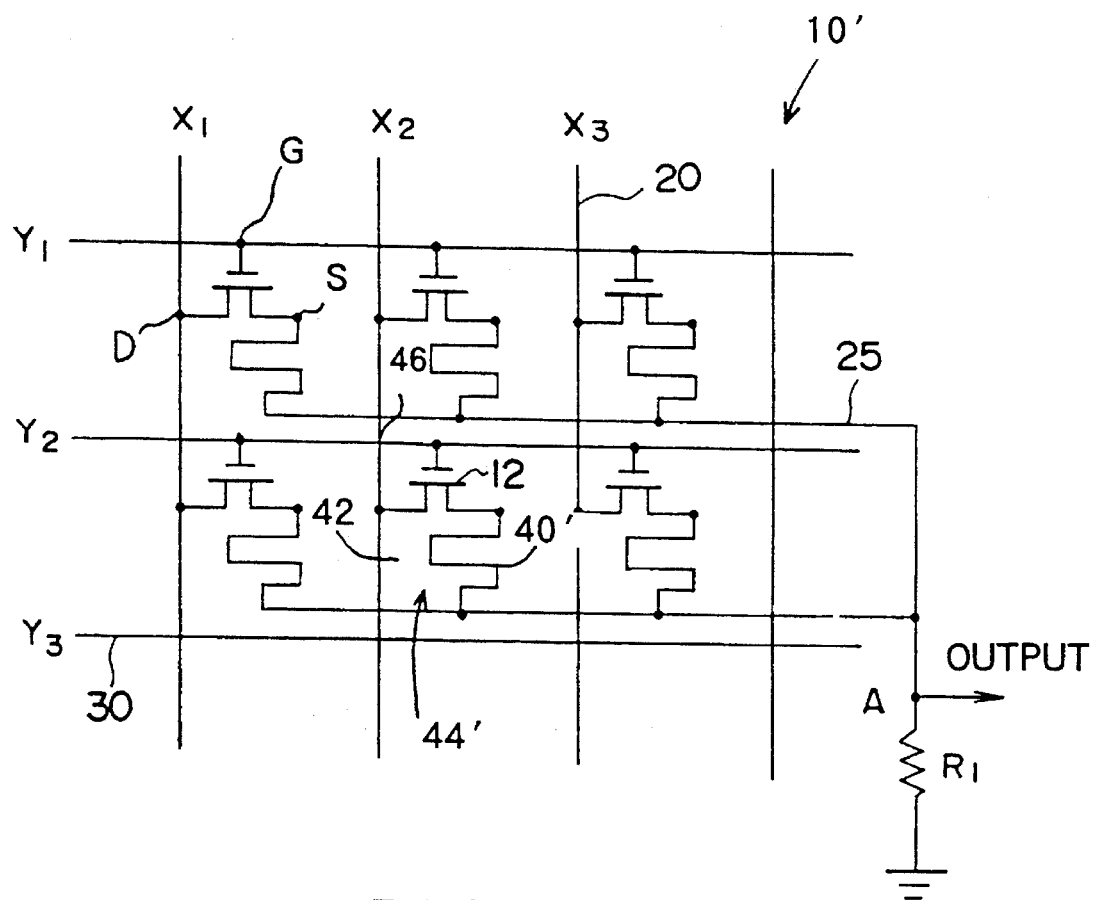
FIG. 6 is a top view of detection elements of an alternative embodiment of the input panel of FIG. 1.

Referring to FIG. 6, an alternative embodiment of surface pressure input panel 1 uses detection elements 44' which include thin-film transistors (TFT's) 12 to electrically couple the magnetic sensitive elements to X and Y electrode lines 20, 30. Transistors 12 each have a gate terminal G connected to the associated Y line, a drain terminal D connected to the associated X line and a source terminal S connected to one end of the magnetic element 40'. The other end of the magnetic elements are coupled to detection electrode lines 25, which are connected together and grounded via a reference resistor $R_1$.

Transistors 12 can be formed onto insulating base plate 10' by conventional techniques, such as photolithography, for example. Transistors 12 are preferably polycrystal transistors as used for driving liquid crystal electrodes because they are reliable and relatively inexpensive to manufacture. However, a variety of conventional transistors or other suitable electrical switches, such as thin-film diodes, for example, can be used in conjunction with the present invention.

To detect a fingerprint pattern with the embodiment shown in FIG. 6, a fingertip F is pressed onto magnetic sheet 2 in the manner described above. When the X register and Y switching circuit converge onto a given intersection point 46, the corresponding transistor 12 turns ON and a current flows through the associated magnetic sensitive element 40' along detection line 25 to ground, thereby generating a potential at the detection point A. Since the magnetic element's resistance reflects the magnitude of the magnetic field, this potential will vary depending on the distance between each magnetic element 40' and the respective overlying portion of magnetic film 2 in the manner described above.

Figure 7:
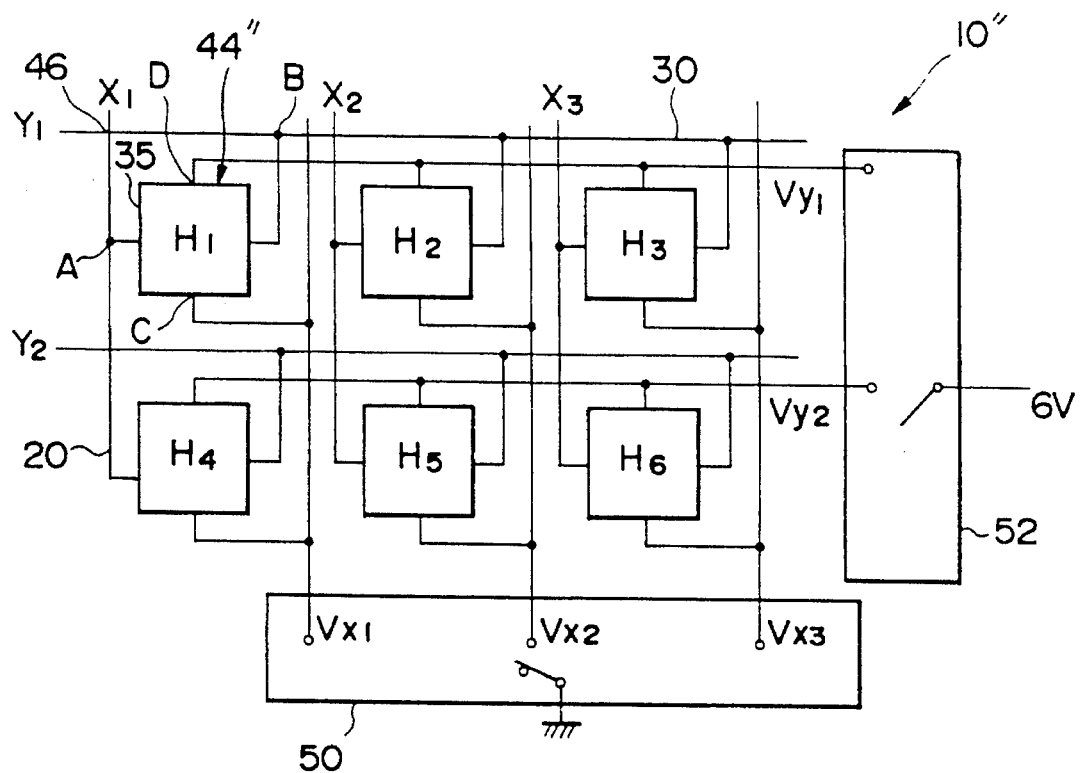
FIG. 7 is a top view of detection elements of another alternative embodiment of the input panel of FIG. 1.

Referring to FIG. 7, another embodiment of surface pressure input panel 1 uses detection elements 44" which include conductive elements 35 for detecting the changes in the magnetic field to which the elements are subjected when overlying portions of magnetic sheet are deflected as a result of pressure applied by fingertip F. Each conductive element 35 has a terminal A connected to one of the X electrode lines 20 and a terminal B connected to one of the Y electrode lines 30. Registers 50, 52 are connected to each conductive element 35 at terminals C, D, respectively, to apply a bias voltage, e.g., 6 volts, and produce a current through each Hall element in the direction from terminal C to terminal D (or vice versa).

Figure 8:
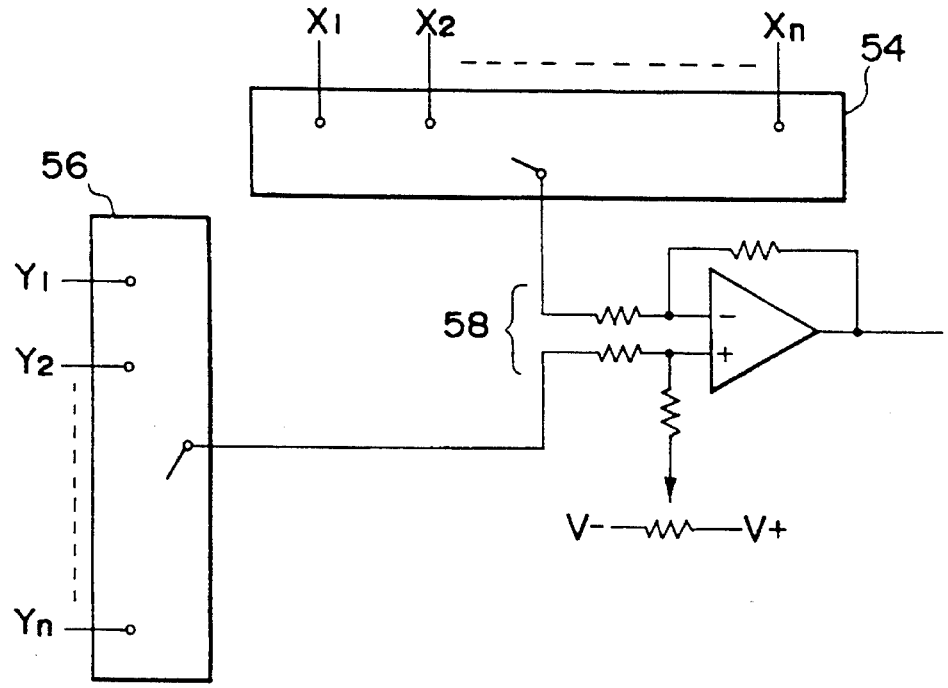
FIG. 8 is a schematic view of a detection circuit for the input panel of FIG. 7.

Preferably, conductive elements 35 are Hall effect elements. The Hall elements 35 are oriented so that the current from registers 50, 52 will be perpendicular to the magnetic field generated by magnetic film 2. When the current and magnetic field are applied to the Hall element 35, an electromotive force or voltage potential is generated between terminals A and B. This voltage is generally proportional to the product of the current density and the magnetic field. As shown in FIG. 8, X and Y electrode lines 20, 30 are connected to switches 54, 56, respectively for detecting the voltage potential generated at A and B terminals by each Hall element 35 (similar to the above embodiments). A differential amplifier 58 is connected to switches 54, 56 to compute the voltage potential.

In use, magnetic sheet 2 and insulating film 3 are laminated to insulating base plate 10" in the manner described above. When fingertip F is pressed against the film and sheet, different overlying portions of magnetic sheet 2 will deflect towards Hall elements 35 by amounts depending on the surface pressure applied by the individual surface variations of the fingertip. The strength of the magnetic field received by each Hall element will vary depending on the distance between it and the overlying portion of magnetic film 2. An equivalent current is applied to each Hall element 35 by registers 50, 52 so that the voltage across terminals A and B is generally proportional to the magnetic field received by the Hall element. This voltage is detected and correlated with the corresponding intersection point 46 to determine the surface pressure at that intersection point. Switches 54, 56 cycle through all of the intersection points as described above so that the arrangement of concave and convex portions of the entire fingerprint can be detected and the sensed fingerprint can be reproduced.

Figure 9:
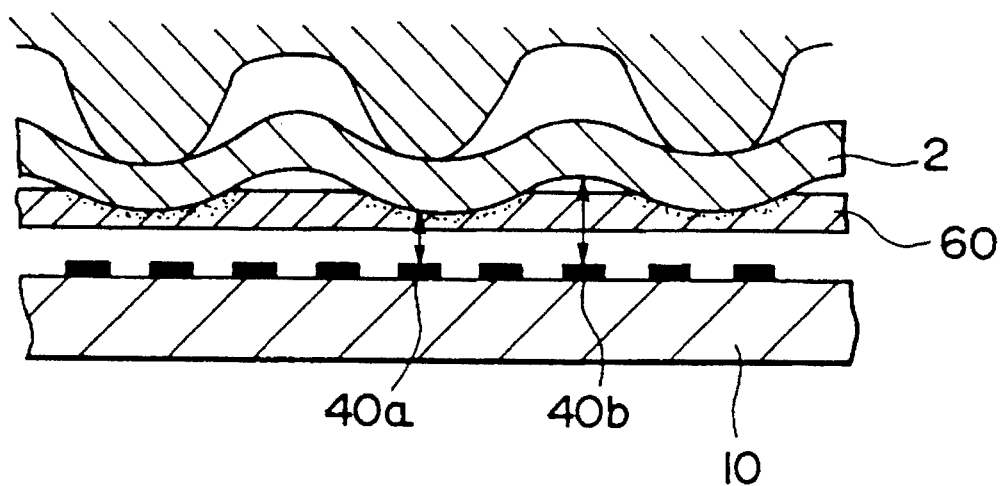
FIG. 9 is an illustrative side view of an alternative embodiment of a magnetic sheet of the input panel of FIG. 1.
Figure 10:
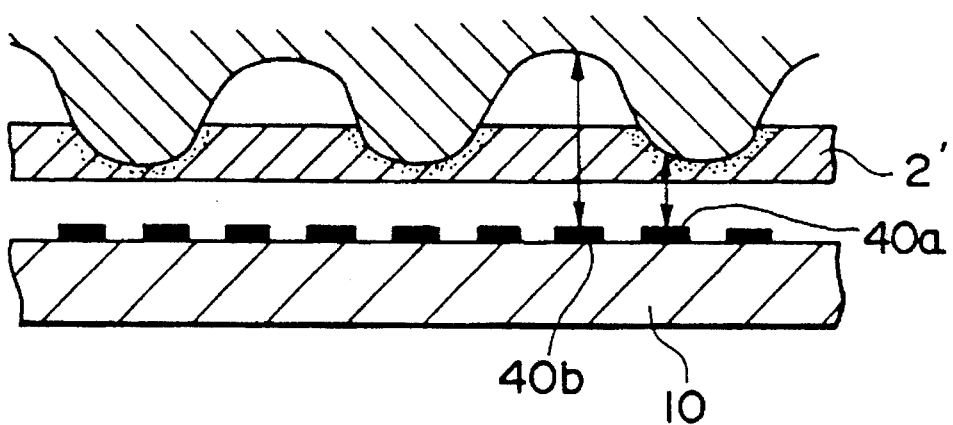
FIG. 10 is an illustrative side view of another alternative embodiment of the magnetic sheet of FIG. 1.

FIGS. 9 and 10 illustrate further embodiments of surface input panel 1. In FIG. 9, the input panel further includes an elastomer 60, such as a sponge sheet, positioned between magnetic sheet 2 and circuit plate 4. Elastomer 60 is adapted to sink in response to pressure thereon from magnetic sheet 2. As shown in FIG. 8, when a ridge portion of fingertip F presses down on a portion of magnetic sheet 2, this portion deflects downwards, thereby causing the underlying portion of elastomer 60 to sink.

In FIG. 10, a different type of magnetic sheet is shown. Magnetic sheet 2' is adapted to sink in conformity with surface contours of the fingertip in the direction of the thickness (depth) when the fingetip is pressed onto the surface of magnetic sheet. As shown in FIG. 9, a magnetically sensitive element 40a located immediately under or adjacent to a ridge portion of fingertip will detect a relatively stronger magnetic field because the overlying portion of magnetic sheet 2 has sunk towards the magnetically sensitive element 40a. Likewise, a magnetically sensitive element 40b located immediately under or adjacent to a groove portion of fingertip F will not detect any change in the strength of the magnetic field because the sheet has not sunk toward the element 40b. Accordingly, a map of the fingerprint can be reproduced in the manner discussed above.

What is claimed is:

1. A surface pressure input panel comprising:

a flexible magnetic sheet; and a circuit plate coupled to the magnetic sheet and having an insulating base plate with intersecting first and second groups of electrode lines formed thereon and magnetically sensitive elements associated with intersection points formed by the electrode lines, coupled to associated electrode lines and facing the magnetic sheet, the magnetically sensitive elements being adapted to generate electrical signals as a function of a distance between the magnetically sensitive elements and respective overlying portions of the magnetic sheet, so that, upon the application of an electrical potential to the element, the generated electrical signals can be sensed and the relative locations of the elements can be determined.

2. The input panel of claim 1 wherein the magnetic sheet generates a magnetic field, the magnetically sensitive elements comprising magnetic resistance elements having a resistance that varies as a function of the magnetic field to which the elements are subjected, the strength of the magnetic field to which the elements are subjected being generally proportional to a distance between the magnetically sensitive elements and respective overlying portions of the magnetic sheet.

3. The input panel of claim 2 wherein each magnetic resistance element is directly coupled to the electrode lines associated with the intersection point for the element.

4. A surface pressure input panel comprising:

a flexible magnetic sheet for generating a magnetic field; and a circuit plate coupled to the magnetic sheet and having an insulating base plate, intersecting first and second groups of electrode lines formed thereon, and magnetically sensitive elements associated with intersection points formed by the electrode lines, coupled to associated electrode lines and facing the magnetic sheet, the magnetically sensitive elements comprising magnetic resistance elements having a resistance that varies as a function of the magnetic field to which the elements are subjected, the strength of the magnetic field to which the elements are subjected being generally proportional to a distance between the magnetic resistive elements and respective overlying portions of the magnetic sheet, the insulating base plate further including switches coupling each magnetic resistance element to the electrode lines associated with the intersection point for the element to generate electrical signals corresponding to the distance between the magnetic resistance elements and respective overlying portions of the magnetic sheet, so that, upon the application of an electrical potential to the element, the generated electrical signals can be sensed and the relative locations of the elements can be determined.

5. The input panel of claim 4 wherein the switches are thin film transistors, the transistors operatively coupling first ends of the magnetic resistance elements to associated first and second groups of electrode lines for use in determining the relative location of each magnetic resistance element, and including signal lines coupled to second ends of the magnetic resistance elements being coupled to a signal line for use in detecting the generated electrical signals.

6. The input panel of claim 1 wherein the magnetic sheet generates a magnetic field, the magnetically sensitive elements comprise conductive elements adapted to generate a voltage corresponding to a strength of the magnetic field to which the elements are subjected, the magnitude of the magnetic field being generally proportional to a distance between the conductive elements and respective overlying portions of the magnetic sheet.

7. The input panel of claim 6 wherein the conductive elements are Hall effect elements.

8. The input panel of claim 1 wherein the flexible magnetic sheet has a surface adapted and sized for receiving a fingertip, the fingertip having an inside surface with contours, the magnetic sheet being adapted to deflect generally in conformity with surface contours of the fingertip when the fingertip is pressed onto the surface of the magnetic sheet.

9. The input panel of claim 1 wherein the first and second groups of electrode lines form an x–y grid.

10. The input panel of claim 1 wherein the electrode lines of each group are substantially parallel and spaced approximately 20–150 μm from each other.

11. The input panel of claim 1 wherein the flexible magnetic sheet has a surface adapted and sized for receiving a fingertip, the fingertip having an inside surface with contours, the magnetic sheet being adapted to sink in conformity with surface contours of the fingertip when the fingertip is pressed onto the surface of the magnetic sheet.

12. The input panel of claim 1 wherein the fingertip has an inside surface with contours, the input panel further including an elastomer positioned between the magnetic sheet and the magnetically sensitive elements, the elastomer being adapted to sink in conformity with surface contours of the fingertip when the fingertip is pressed onto the magnetic sheet.

13. An apparatus for use in mapping physical surface irregularities of an object, the apparatus comprising:

a pressure sensitive magnetic sheet adapted to deflect locally in substantial conformity with the surface irregularities when the object is pressed against a first side of the sheet;

an insulating base plate facing a second side of the sheet;

a multiplicity of magnetically sensitive elements distributed over the base plate and spaced from the sheet, the elements being adapted to generate electrical signals responsive to a magnetic field to which the elements are subjected so that the electrical signals reflect deflections of respective overlying portions of the sheet towards corresponding magnetically sensitive elements when the surface irregularities of the object apply pressure to the overlying portions of the sheet;

first and second groups of electrically conductive intersecting lines formed on the insulating base plate for determining the relative locations of the magnetically sensitive elements from which the electrical signals emanate; and whereby the surface irregularities can be mapped on the basis of the generated electrical signals and the relative locations of the magnetically sensitive elements.

14. The apparatus of claim 13 wherein the determining means comprises first and second groups of electrically conductive lines which intersect each other, and means for insulating the lines of the first group from the lines of the second group.

15. The apparatus of claim 14 wherein the first and second groups of lines are substantially perpendicular with respect to each other and define an x–y grid of lines.

16. The apparatus of claim 14 wherein the lines are carried on the substrate.

17. The apparatus of claim 13 wherein the magnetically sensitive elements are arranged in an x–y array.

18. The apparatus of claim 14 wherein the magnetically sensitive elements comprise magnetic resistance elements having a resistance that varies as a function of the magnetic field to which the magnetic resistance elements are subjected, the magnetic field generated by the magnetic sheet being generally proportional to a distance between the magnetic resistance elements and respective overlying portions of the magnetic sheet.

19. The apparatus of claim 18 wherein the magnetic resistance elements are each electrically coupled to an associated electrode line of the first and second groups such that, when an electric potential is applied to the associated electrode lines, a current flows through the magnetic resistance element, the magnitude of the current being substantially proportional to the magnetic field to which the magnetic resistance elements are subjected.

20. The apparatus of claim 13 including a thin film transistor operatively coupled to the elements and the determining means.

21. The apparatus of claim 14 wherein the magnetically sensitive elements comprise conductive elements, the apparatus further including means for directing a current through the conductive elements, the conductive elements being adapted to generate a voltage generally proportional to a density of the electric current and a magnitude of a magnetic field from the magnetic sheet to which the elements are subjected.

22. An apparatus for use in mapping physical surface irregularities of an object, the apparatus comprising:

a touch panel including a pressure sensitive magnetic sheet adapted to deflect locally in substantial conformity with the surface irregularities when the object is pressed against the sheet, an insulating base plate attached to the sheet, intersecting first and second groups of electrode lines on the substrate forming intersection points where the electrode lines cross, and magnetically sensitive elements associated with the intersection points, coupled to the associated electrode lines, facing the magnetic sheet, and being spaced apart from the sheet, the magnetically sensitive elements being adapted to generate electrical signals that correspond to a distance between the magnetically sensitive elements and respective overlying portions of the magnetic sheet and to apply the generated electrical signals to the electrode lines, the substrate further including a plurality of switches operatively coupled to the magnetically sensitive elements and the determining means;

means, coupled to the first group of electrode lines, for applying an electric potential to the first and second groups of electrode lines; and a detection circuit operatively coupled to the first and second electrode lines for sensing the generated electric signals and determining the locations of the magnetically sensitive elements to thereby enable a reconstitution of the surface irregularities of the object.

23. The apparatus of claim 22 wherein the magnetically sensitive elements comprise magnetic resistance elements.

24. The apparatus of claim 22 wherein the magnetically sensitive elements comprise conductive Hall effect elements.

25. A method for detecting a fingerprint pattern from a fingertip comprising the steps of:

providing a flexible magnetic sheet coupled to a circuit plate, the circuit plate having a multiplicity of magnetically sensitive elements facing and spaced from the magnetic sheet;

pressing the fingertip against the magnetic sheet such that the magnetic sheet generally conforms to contours of the fingertip and deflects toward a group of the magnetically sensitive elements;

generating an electrical signal with the magnetically sensitive elements which reflects a distance between the magnetic elements and respective overlying portions of the magnetic sheet;

detecting the electrical signals; and determining a relative location of the magnetically sensitive elements;

whereby the fingerprint pattern can be recreated by correlating the electrical signals with the location of the magnetically sensitive elements.

* * * * *